Sept. 12, 1967     KIYOSHI ICHIHARA     3,340,695
METHOD OF SEPARATING CARBON MONOXIDE FROM
OXYGENIZED CONVERTER GAS
Filed Sept. 16, 1964
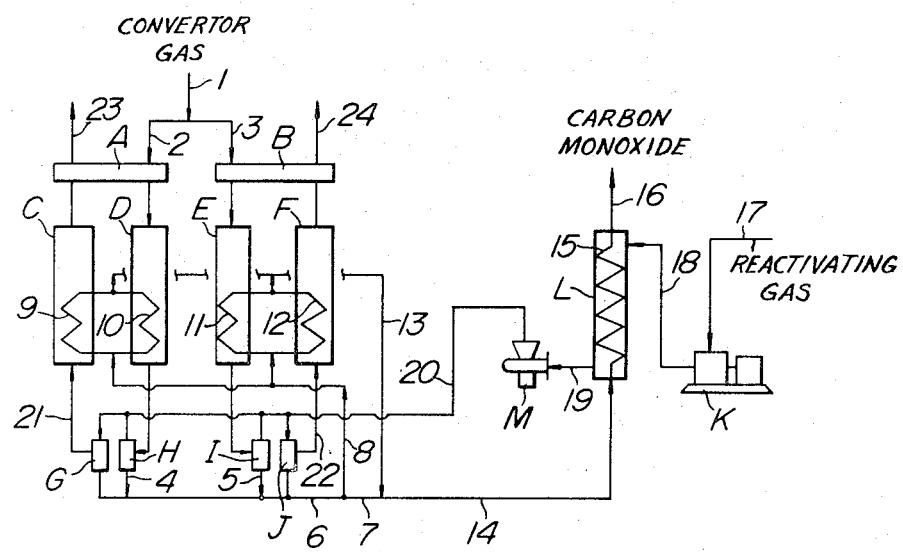
INVENTOR
KIYOSHI ICHIHARA
BY Paul M. Craig, Jr.
ATTORNEY : 3,340,695
METHOD OF SEPARATING CARBON MONOXIDE FROM OXYGENIZED CONVERTER GAS Kiyoshi Ichihara, Hitachi-shi, Japan, assignor to Hitachi, Ltd., Chiyoda-ku, Tokyo, Japan, a corporation of Japan
Filed Sept. 16, 1964, Ser. No. 396,863
Claims priority, application Japan, Sept. 17, 1963, 38/49,241
4 Claims. (Cl. 62—12)

This invention relates to methods of separating carbon monoxide from oxygenized converter gas.

Generally, oxygenized converter gas consists essentially of carbon monoxide and carbon dioxide gas and its typical composition, for example, includes from 85 to 90% of CO, from 7 to 12% of $CO_2$, 2% of $H_2$, and 1% of other materials. Therefore, carbon monoxide of high concentration can easily be obtained from the oxygenized converter gas by simply removing carbon dioxide gas therefrom and thus the oxygenized converter gas is highly valuable in the chemical industry as a raw material for the production of acetic acid, for the synthesis of methanol, etc.

A difficulty hitherto experienced with separation of carbon monoxide from oxygenized converter gas is the high cost involved in the removal of carbon dioxide gas which is contained in the converter gas in such a large amount. Carbon dioxide gas is generally separated from converter gas by the use of an absorbent such as monoethanolamine or ammonia water which effectively absorbs carbon dioxide gas. However, prior methods for the industrial separation of carbon monoxide from converter gas are quite disadvantageous in an economical aspect in that such a high content of carbon dioxide gas necessarily requires a great amount of steam consumption for the reactivation of absorbent and a slot of cost is involved in the construction of apparatus, and thus the cost of carbon dioxide gas removal occupies a great part of the cost for the production of carbon monoxide.

The present invention contemplates to eliminate prior drawbacks as described above and has for its object to provide a new and improved method for the industrial separation of carbon monoxide from converter gas which includes the use of a regenerator for the removal of carbon dioxide gas and the supply of a gaseous medium for the reactivation of the regenerator from a suitable other source.

As is commonly known, regenerators are most widely used in air liquefying and separating apparatus and operate remarkably effectively to remove moisture and carbon dioxide gas in air, but there is a certain limitation for the proper operation of the same. Or more precisely, it is necessary to supply a large amount of reactivating gas into the regenerator in order to remove by sublimation carbon dioxide gas or moisture condensed onto the surfaces of regenerating substances filled in the regenerator to thereby reactivate the regenerator for subsequent operation. In the air liquefying and separating apparatus, nitrogen occupying about 79% of raw air is used as the reactivating gas, but in the case of converter gas, it is impossible to obtain a necessary amount of reactivating gas because the greater part of raw gas is occupied by carbon monoxide which is to be separated as a product. In other words, according to a prior way of thinking, the regenerator is quite unfit for incorporation in a carbon monoxide separation system.

The present invention overcomes what has been considered impracticable in the prior art and establishes a novel method of separating carbon monoxide from converter gas in which the shortage of reactivating gas for the regenerator is replenished from other sources to effect removal of carbon dioxide gas at low cost.

According to the present invention, there is provided a method of separating carbon monoxide from converter gas including removing carbon dioxide gas from the converter gas for obtaining carbon monoxide of high purity, said method comprising providing a regenerator, causing the converter gas to pass through the regenerator for the removal of carbon dioxide gas therefrom, and supplying a reactivating gas into the regenerator for the reactivation of the same.

There are other objects and particularities of the present invention which will become obvious from the following description with reference to the accompanying drawing, in which the sole figure is a schematic flow diagram of a preferred form of an apparatus for practicing the method according to the present invention.

Generally, steel-making plants, in which converted gas is generated, need a large amount of oxygen for steel making and are commonly equipped with an air separating apparatus to separate oxygen from air. Nitrogen gas simultaneously separated from the air finds little service in the steel-making plant and the greater part of nitrogen gas is commonly discharged again in the air.

Therefore, use of the nitrogen gas as medium for the reactivation of the regenerator will hardly induce a loss in the plant economy. Further, the nitrogen gas to be supplied need not be of high purity and the only requirement is that its oxygen content be held below a certain limit to inhibit oxygen from mixing with carbon monoxide to form a detonation gas.

In an air separating apparatus, about 30% of raw air is generally taken into the apparatus in a state free from carbon dioxide gas and moisture and may preferably be used as a reactivating gas for the regenerator to extremely simplify and permit a compact arrangement of the converter gas separting apparatus. Even if the use of such particularly treated raw air can not be expected, waste nitrogen gas discharged from the air separating apparatus may be utilized for the reactivation of the regenerator. In this latter case, the waste nitrogen gas includes substantially saturated moisture and carbon dioxide gas of the order of from 350 to 450 p.p.m. and it is necessary to preliminarily remove these matters. It will however be readily understood that this waste nitrogen gas can be obtained entirely free of cost because it has hitherto been uselessly discharged to the atmosphere and that the removal of carbon dioxide gas of only 350 to 450 p.p.m. contained in the waste nitrogen gas is far easier and more advantageous than the removal of carbon dioxide gas contained in the converter gas in an amount of from 7 to 12%.

The present invention will now be described with reference to the drawing. Converter gas is admitted into the apparatus by way of a line 1 and compressed to a pressure of about 6 atmospheres absolute. Then, the converter gas is divided into two flows, each being 50% of the initial volume. The respective flows are made to pass through lines 2 and 3 and change-over means A and B into respective regenerators D and E. As will be apparent from the drawing, regenerators C and D, and E and F are arranged to constitute pairs and the regenerators in each pair are arranged to be alternately changed over from one to the other. In the state as shown in the drawing, cold is held in the regenerators D and E which have been refrigerated in the preceding cycle by a reactivating gas, while moisture and carbon dioxide gas removed by condensation from the converter gas in the preceding cycle are held in the frozen state in the regenerators C and F. Therefore, the two flows of converter gas are refrigerated to a temperature of the order of −170° C.

by the cold held in the respective regenerators D and E, then conducted into lines 4 and 5 through check valves H and I, and finally into a common line 6, respectively. A portion of the converter gas collected in the line 6 is equally distributed into coiled tubes 9, 10, 11 and 12 in the respective regenerators C, D, E and F through a line 8 for being warmed up to a temperature of the order of $-100°$ C. The converter gas having passed through the tube side of the regenerators is collected in a line 13 and joins with the remainder of the converter gas from a line 7, warmed up to atmospheric temperature by being passed through a line 14 and a coiled tube 15 in a heat exchanger L, and finally taken out of the apparatus through a line 16. The converter gas leaving the apparatus is entirely free from moisture and carbon dioxide gas since these matters have been removed by condensation in the regenerators.

On the other hand, nitrogen gas from an air separating apparatus is led through a line 17 into a blower K, where it is compressed to an extent that an amount of cold produced by adiabatic expansion of the nitrogen gas in an expansion turbine M may be substantially equal to an amount of loss of cold in the entire apparatus. Then the compressed nitrogen gas is fed through a line 18 into the heat exchanger L for being precooled through heat exchange with the carbon monoxide component separated from the converter gas. The nitrogen gas is subsequently led through a line 19 into the expansion turbine M where it is adiabatically expanded to a low temperature of the order of $-175°$ C. The nitrogen gas is then fed into the respective regenerators C and F through check valves G and J and lines 21 and 22 to sublimate the moisture and carbon dioxide gas for removal from the regenerators C and F and at the same time to transfer the cold to regenerating substances filled in the regenerators. The nitrogen gas thus rendered to have atmospheric temperature is finally discharged exteriorly of the apparatus through the changeover means A and B and lines 23 and 24.

From the foregoing description, it will be understood that the present invention takes advantages of the physical properties of carbon dioxide gas to remove it from converter gas by means of sublimation. Thus, the invention is advantageous in a simple arrangement of the apparatus therefor and a marked reduction in the cost for the removal of carbon dioxide gas.

What is claimed is:

1. A method of separating carbon monoxide from converter gas including removing carbon dioxide gas from the converter gas so as to obtain carbon monoxide of high purity, said method comprising passing the converter gas through at least one regenerator, said regenerator being previously cooled to about $-170°$ C. by the passage of a reactivating gas therethrough whereby the moisture and carbon dioxide in said converter gas freeze out in said regenerator, passing the converter gas substantially free from carbon dioxide and moisture through a heat exchange means so as to warm the same to approximately room temperature by heat exchange will a reactivating gas which is simultaneously supplied thereto from an air separating apparatus, said reactivating gas being thereby precooled and then, after passing through said heat exchange means, being adiabatically expanded so as to cool said reactivating gas to a temperature of about $-175°$ C. from where it is passed through a second regenerator in order to sublimate the frozen moisture and carbon dioxide contained therein from the preceding cycle, and then removing the substantially pure carbon monoxide from said heat exchange means.

2. A process according to claim 1, wherein said reactivating gas is nitrogen.

3. A process according to claim 1, wherein said reactivating gas is air substantially free of moisture and carbon dioxide.

4. A process according to claim 1, wherein at least a portion of the substantially moisture- and carbon dioxide-free converter gas is recycled back to the regenerator through an independent pipe means prior to the passage thereof through said heat exchange means, whereby the recycled converter gas is warmed to a temperature of about $-100°$ C.

References Cited
UNITED STATES PATENTS

| | | | |
|---|---|---|---|
| 1,979,682 | 11/1934 | Frankl | 62—13 |
| 2,089,558 | 8/1937 | Karwat | 62—12 |
| 2,737,784 | 3/1956 | Becker et al. | 62—14 X |
| 2,915,880 | 12/1959 | Schuftan et al. | 62—38 X |
| 2,924,078 | 2/1960 | Tsunoda. | |
| 2,955,434 | 10/1960 | Cost | 62—29 X |
| 3,209,548 | 10/1965 | Grumberg et al. | 62—13 X |

NORMAN YUDKOFF, *Primary Examiner.*

WILBUR L. BASCOMB, JR., *Examiner.*

V. W. PRETKA, *Assistant Examiner.*